Oct. 28, 1958 R. L. PARSHALL ET AL 2,857,762
PENDANT VANE FLOW METER
Filed Aug. 23, 1954 3 Sheets-Sheet 1

RALPH L. PARSHALL
ALFRED J. RYAN
MAX LUTON
INVENTORS

BY

ATTORNEYS

Oct. 28, 1958    R. L. PARSHALL ET AL    2,857,762
PENDANT VANE FLOW METER
Filed Aug. 23, 1954    3 Sheets-Sheet 2
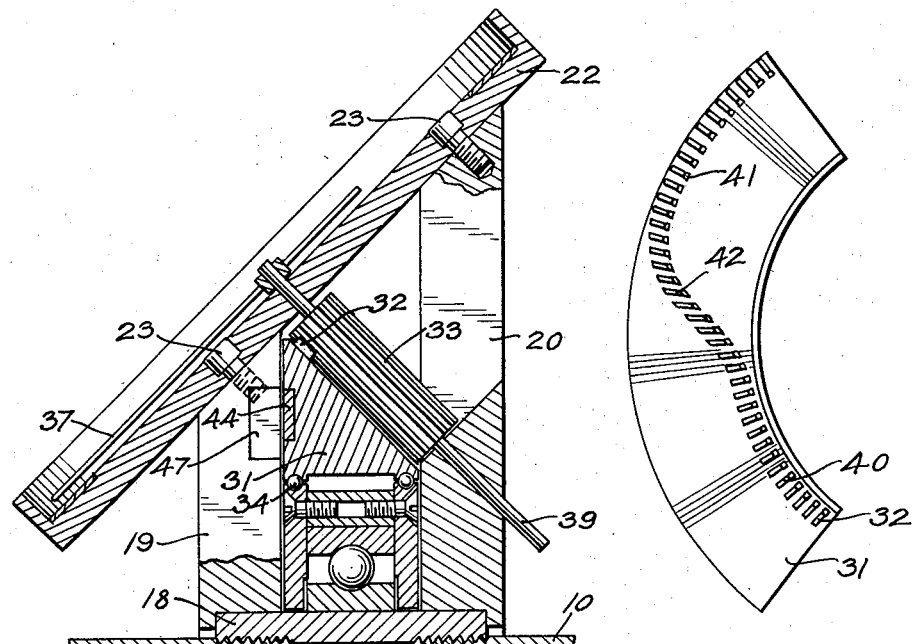
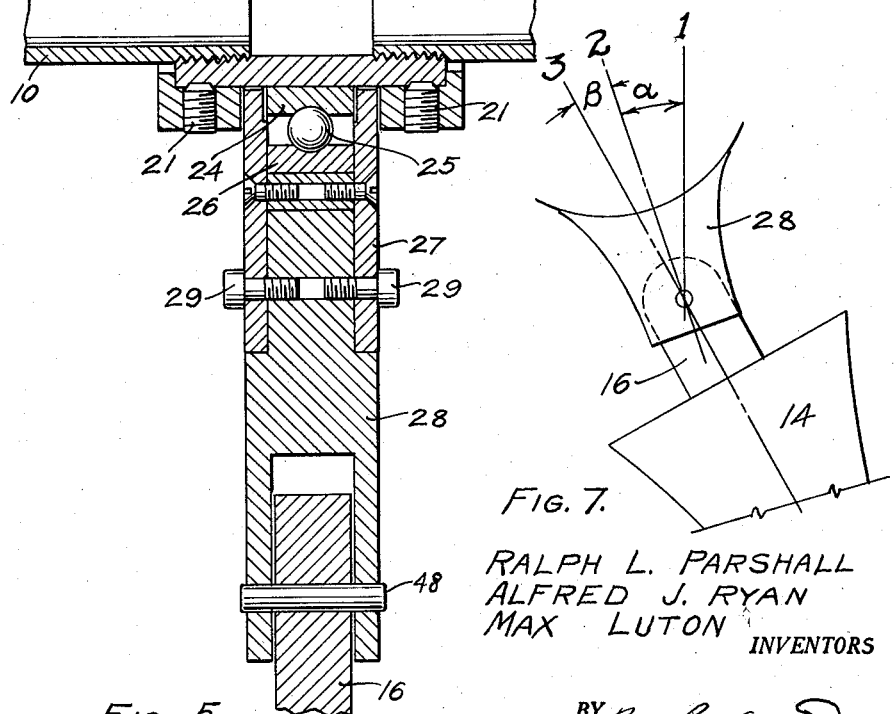
FIG. 5.    FIG. 6.    FIG. 7.
RALPH L. PARSHALL
ALFRED J. RYAN
MAX LUTON
INVENTORS
BY
ATTORNEYS Oct. 28, 1958　　R. L. PARSHALL ET AL　　2,857,762
PENDANT VANE FLOW METER Filed Aug. 23, 1954　　3 Sheets-Sheet 3

RALPH L. PARSHALL
ALFRED J. RYAN
MAX LUTON
　　　INVENTORS

BY

ATTORNEYS

United States Patent Office 2,857,762
Patented Oct. 28, 1958

2,857,762
PENDANT VANE FLOW METER

Ralph L. Parshall, Fort Collins, and Alfred J. Ryan and Max Luton, Denver, Colo.; said Parshall and said Luton assignors to Alfred J. Ryan Application August 23, 1954, Serial No. 451,582

4 Claims. (Cl. 73—228)

This invention relates to the mensuration apparatus, and more particularly it relates to meters for mensuration including meters for accurately indicating the volume of flow of fluid in confined bounds without vibration and interference from extraordinary forces associated with such flow.

In measuring the flow of a fluid, whether in an open conduit or in a closed pipe or conduit, a vane in contact with the flow and subjected to the forces of the flow tends to provide a means for indicating the forces acting on the vane. Vane-type meters have found considerable use where variable conditions of flow are to be measured. In a stream of flowing fluid a suspended vane may be made to fairly accurately indicate one particular volume of flow, but varying the rate of flow or the depth of the flowing fluid may drastically reduce the accuracy of the measurement for the use of the vane. An indicating vane suspended in a fluid planes or tends to rise to the surface of the stream of fluid, and the force of the planing is not a constant or necessary proportional factor which may be measured or compensated for. Likewise, a vane suspended in a fluid body exhibits a buoyancy effect which changes under various conditions of flow. Both the planing and buoyancy effect vary substantially with variations of fluid velocity, the amount of contact of the fluid with the vane, surges and pulsations in the flow, etc. The accuracy of the mensuration of the flow of fluid is affected by this planing and buoyancy effects. These effects are detrimental to the use of a vane whether the vane is used in a closed or open conduit under full or partially full flow condition. Vibration, surging, current patterns, etc., of a flowing fluid are transmitted through the vane to the measuring indicia and reduces the accuracy of the measurement. The indicia oscillate to such an extent that only an average reading can be obtained. Extraordinary movements caused by surges of the fluid or by foreign matter in the stream, also, causes distortions of the measuring indicia. Vibrations and movement caused by surges and extraordinary movements are especially detrimental where recording apparatus is used to measure the flow.

According to the present invention there is provided a flow meter which accurately measures those forces of a flow of fluid which provide substantially direct means for determining the volume of the flow of the fluid being measured. The invention includes a device which may be used in an open conduit of substantially any cross section at the point of measurement and at substantially any level of flow of fluid in the conduit. Furthermore, the device may be used in closed conduits at partial or at full flow and with various fluids including liquids, gases, etc. The measuring apparatus is not subject to the distortions produced by planing, buoyancy, surging, and the like. Further, novel damping means are provided in a meter for reducing normal vibrations of the detecting or sensitizing means of the meter. Damping means are provided in a flow meter for preventing or substantially reducing movement or vibration caused by large, sudden shocks on the measuring apparatus.

Included among the objects and advantages of the present invention is a flow meter for indicating direct forces of a flow of fluid whereby to provide means for accurately indicating volume of flow. The invention provides a novel pendant vane and connection means for reacting only to direct forces of flow which affect the volume of flow without noticeable distortion from ancillary and irregular forces in the stream of fluid. A meter is provided with novel damping means which provides a variable damping from minimum damping at smallest movement of the meter indicia to maximum damping at the greatest movement thereof. The meter also provides a shock absorber for absorbing violent and extraordinary movement and shocks of the linking mechanism and/or the detecting or sensitizing means for the meter. The invention, furthermore, includes a conical vane having a shallow, concave side wall adapted to proportionately react to the forces of flow of the fluid. The invention also includes a non-rigid or free swing connection between a pendant vane and indicating meter, whereby substantially only the forces of the flow attributable to velocity and depth of stream or associated with volume of flow are transmitted to the indicating meter.

These and other objects and advantages of the invention may be readily ascertained by referring to the description and appended drawings, in which:

Fig. 5 is a sectional view of the meter of Fig. 4 taken along section line 5—5;

Fig. 6 is a top plan view of the variable rack of the multiplying mechanism according to the invention; and Fig. 7 is an enlarged detail of a flexible connection between the vane and the meter according to the present invention showing in exaggerated scale the positions of the various parts.

Figures 1, 2:
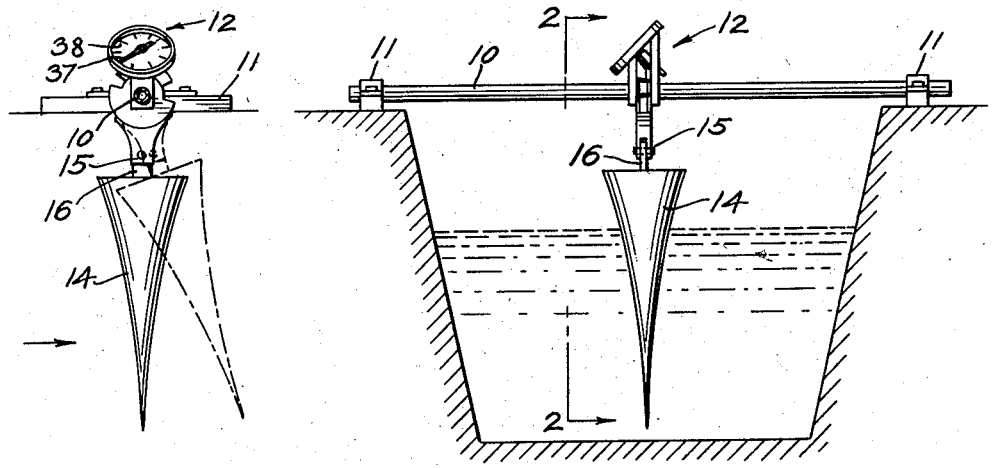
Fig. 1 is a front elevation of a flow meter according to the invention assembled in an open trapezoidal conduit or flume.
Fig. 2 is a side elevation of the assembly of Fig. 1 illustrating the movement of the vane in relation to stream flow
Figure 3:
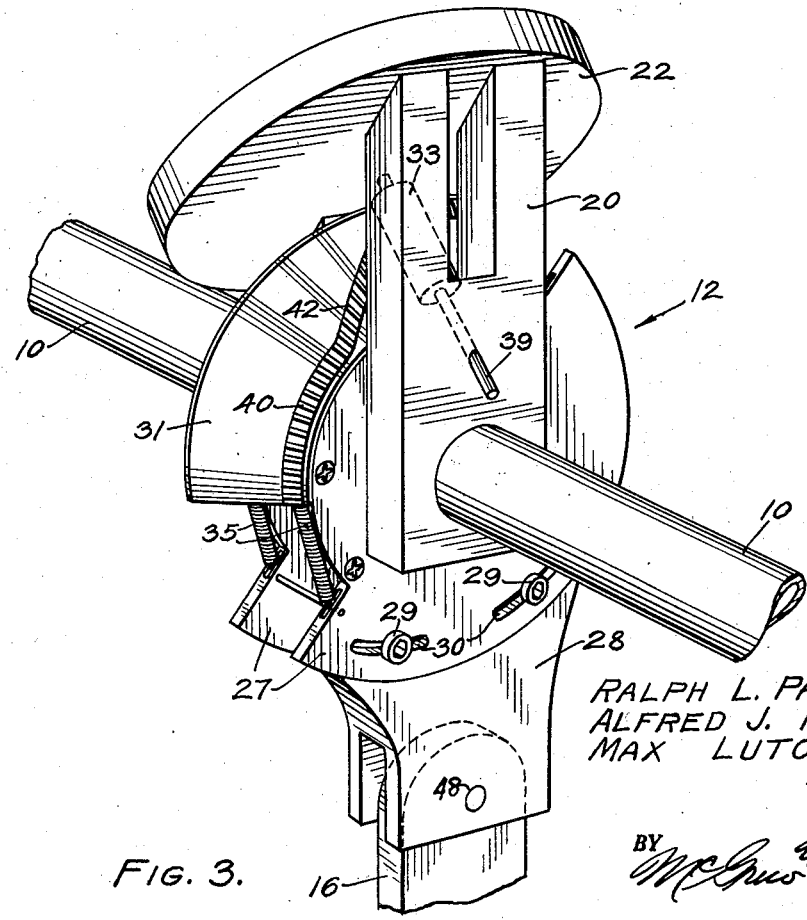
Fig. 3 is a perspective view of an indicating meter according to the invention showing a variable multiplying rack and pinion to provide a variable multiplied movement of an indicating pointer of the meter.
Figure 4:
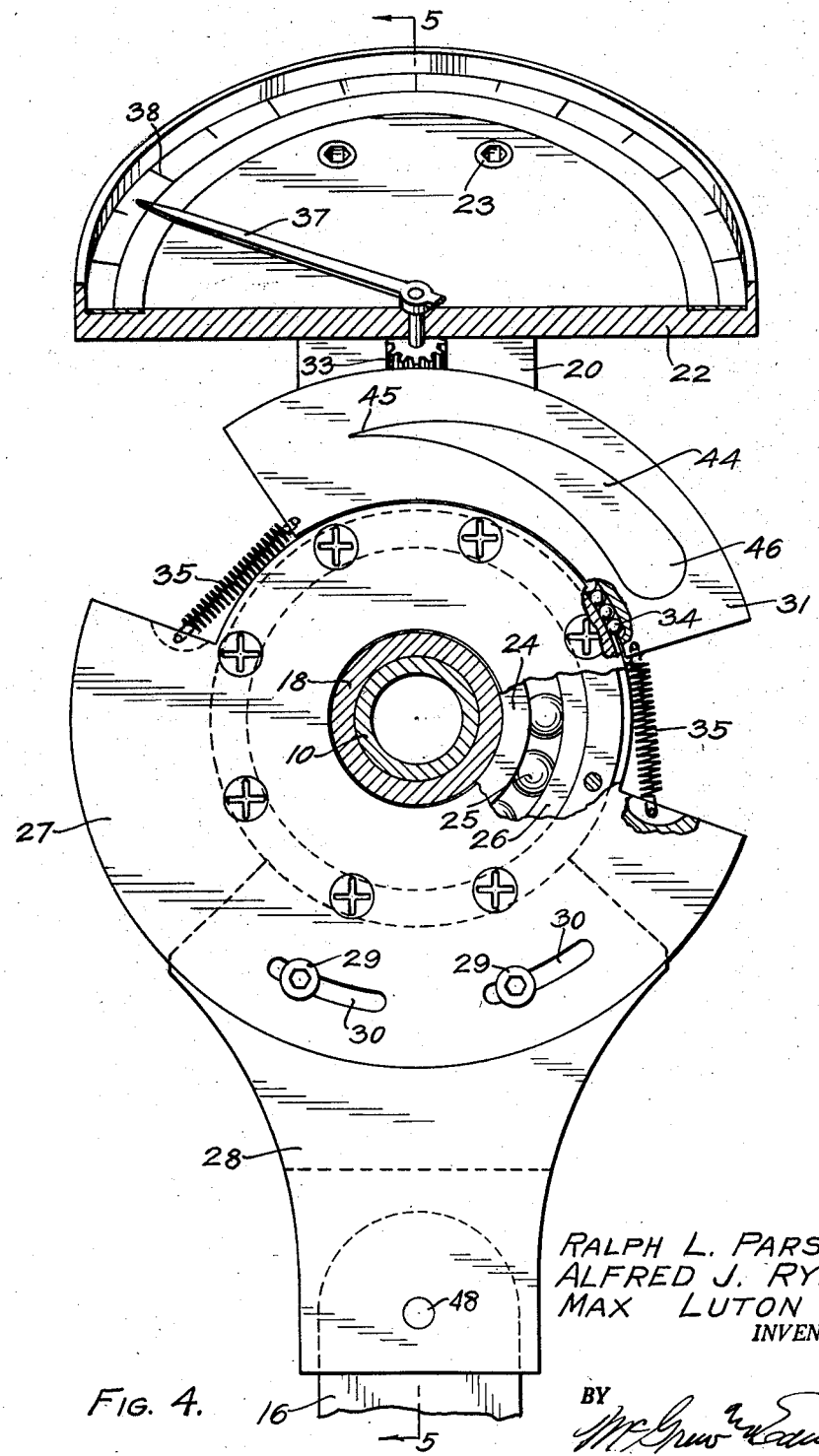
Fig. 4 is an elevation of the meter, in partial broken away section, showing a damping mechanism according to the invention.

Figures 1 and 2 illustrate an assembly of the invention placed in a trapezoidal ditch or flume for measuring the flow of fluid past the particular assembly. A supporting rod 10 is secured to rod supports 11 on the top of a ditch, in a position so that the bar is substantially immobile and specifically the bar must be secured so that it will not rotate. A measuring gauge or meter 12 is secured to the rod. A pendant vane is secured to linking mechanism of the meter. The pendant vane 14 is secured to the meter by means of a free swinging hinge 15, which permits the vane to freely swing in streamline direction, i. e., in the direction of the flow of the stream. The vane 14 is a frustum of a right cone with a slightly concave wall. The base of the frustum is substantially larger than the top, and the height of the frustum is substantially greater than the diameter of the base. The frustum can be used in measuring the flow of fluid in substantially any measurable cross section of open conduit, or in any closed conduit. The vane is useful for measuring flow of fluids at partial or full flows of fluid in the conduits. The size of the vane must, of course, be regulated to the size of the conduit, and the meter to be utilized in measuring the forces acting on the cone must be calibrated to the particular section through which the flow of fluid is passing. The vane is suspended so that its small end is just above the floor of the ditch. The following table gives the basic measurements for the conical vane, and the vane may be made using any multiple of either the distance from the hinge or any multiple of the width of the vane.

*Table I*

| Distance from center line of hinge, feet | Diameter of Vane, feet |
| --- | --- |
| 0.25 | 0.558 |
| 0.35 | 0.392 |
| 0.45 | 0.285 |
| 0.55 | 0.208 |
| 0.65 | 0.153 |
| 0.75 | 0.117 |
| 0.85 | 0.088 |
| 0.95 | 0.064 |
| 1.05 | 0.042 |
| 1.15 | 0.022 |
| 1.25 | 0.003 |

The vane is connected to the indicating meter by means of a free swinging hinge in the direction of streamline flow. This connection may be either a free swinging hinge or a flexible connection so long as the vane swings freely in streamline direction, so that the vane and connection automatically compensate for irregular forces of planing, buoyancy, friction, etc. The contour of the vane, when calibrated for the conduit section in which it is used to measure the flow, provides a direct means for measuring the quantity of flow. The measurement may be secured in an open conduit for either partial or full flow, or in a closed conduit at both partial and full flows. The force which the vane transmits to the measuring meter is in direct ratio to the quantity of flow through the conduit. The flexible connection between the vane and the meter substantially reduces the extraneous forces on the vane, which include planing due to the velocity of the fluid rushing past the vane, buoyancy of the vane in the fluid, friction of the fluid on the surface of the vane, and the like. These forces are automatically compensated by the flexible connection. For example, if a vane with a flexible connection is inserted into a motionless body of fluid, due to waves, the vane may move out of its free gravitational position by bending at the hinge, but the meter will not record such movement. If a wooden vane, for example, is inserted in a body of water, the vane will attempt to float due to buoyancy. The hinge will permit the floating, and no force from the buoyancy will be exerted on the meter. The other irregular forces are, likewise, compensated by the hinge, and only the direct forces of velocity and depth are transmitted from the vane to the meter.

The hinge 15 may be substantially any type of hinge which will provide free swinging of the vane in a streamline direction. For open conduit work, as for example in irrigation ditches, the hinge should be a frictionless, oilless bearing hinge which will operate under normal outdoor conditions with a minimum of maintenance. Outdoor installations are preferably oilless so that the dust will not accumulate in the hinge and prevent the free movement of the hinge. A dry oilless hinge such as a nylon hinge is satisfactory for normal agricultural use. In closed conduits, and the like, various different types of hinges may be satisfactory, as such hinges would be protected from atmospheric conditions. A flexible rod or support, e. g. a thin metal strip, may be substituted for the hinge 15 to provide substantially the same action. However, it is preferable to have a flexible coupling or connector between the vane and the meter to permit free motion of the vane in a streamwise direction rather than in all directions.

The meter of the invention comprises a connector 18 into which are threaded the ends of a split bar or pipe 10, and the connector forms the base for the immobile portions of the meter. A front upright 19 and a rear upright 20 are secured in position on the connector by means of set screws 21. A dial or calibrated scale 22 is secured to the uprights by means of bolts 23. An inner bearing race 24 is secured to the pipe connector 18, and an outer bearing race 26 is juxtaposed with the inner race 24. The races are maintained apart by means of ball bearings 25 which permit free movement of the outer race 26 around the inner race. A pendant connector 27 is secured to the outer race 26. A pendant support 28 is adjustably secured to the pendant connector 27 whereby the pendant support may be adjusted to a zero position or setting. The set screws 29 are threaded into the pendant support 28 and ride in slots 30 in the pendant connector to permit adjustment of the pendant support in relation to the connector. The pendant support and connector provide a pendant lever arm for moving an indicating pointer on a calibrated gauge. The lever arm moves a rack support 31 on which is mounted a rack 32. As the rack moves it turns a pinion 33 which turns the indicating pointer of the gauge. As the pinion turns by movement of the rack across the pinion, an indicating needle 37, secured to the shaft of the pinion, moves along a calibrated scale 38 on the face of the dial support 22. To provide free movement between the rack support and the pendant connector, a series of small ball bearings 34 are used for the free movement. The rack support is connected to the pendant connector by means of a series of springs 35, which provide movement of the rack support in relation to movement with the pendant connector. In addition to providing movement therebetween, the springs provide a damping effect for severe jolts and movements of the pendant lever arm. For example, if the meter is being used in an open irrigation flume with a pendant vane suspended in a stream of flowing water and a stick or log or other flowing debris flowing down the stream of water strikes the vane, the pendant lever arm will be sharply jostled, but the shock of the jolt will be absorbed by the springs.

Where the indicating device is to be used with a recording apparatus, an extended shaft 39 on the pinion provides means for connection with a recording device. The recording device is easily mounted on the bar 10, and a simple connection with the shaft 39 provides means for moving the indicating means of the recording device. Such recording devices in general include a timer operating the chart or record, and an indicating needle on which is mounted a pen for marking the measurement on the chart.

The rack 32 is placed on an arcuate rack support, and includes a small radius rack portion 40 and a large radius rack portion 41 interconnected by means of an intermediate rack portion 42. The rack and pinion provide multiplying means for transforming the movement of the detector and movement of the lever arm into rotational movement of an indicating needle. The rack extending along various radii from the point of rotation provides a variable multiplying means for the needle. The maximum radius portion 41 is placed in position of the low reading of the scale to provide greater magnification of movement of the needle at that point, while the small radius portion is placed at the maximum reading of the scale where a lesser magnification of the movement is desired. As the pinion moves along the rack, it passes through the intermediate portion 42 which provides for a decreasing multiplication down to the minimum multiplication. It is obvious that with such a variable multiplying device, the unit calibrations at the low end of the scale may be stretched out or expanded while the unit calibrations at the high end of the scale may be condensed. The rack and pinion provide in effect a multiple scale meter for increased accuracy for low and high readings. For example, in the use of the scale, at a flow of five cubic feet of water per second, a half a cubic foot per second is a significant quantity of the total flow, that is, ten percent. At one hundred cubic feet per second a half a cubic foot per second of flow is substantially insignificant since it is one-half of one percent of the total. The multiple scale provides for magnification of readings at any desired point on the scale. In the example, the rack at the low end of the scale provides for an increase movement of the needle for a half a cubic foot flow whereas a lesser movement of the needle is provided for the half a cubic foot flow at the hundred cubic feet mark.

In any flow of fluid, the flow currents set up in the flowing fluid including surges, waves, and so forth induce vibrations into the measuring devices of the flow. Vibrations and extraordinary movement of the indicating means are extremely detrimental to the accuracy of the indicating means, especially where the flow is being continuously recorded so that the total flow throughout a period may be determined. Vibrations and extraordinary movements of the indicating means disturb the accuracy of the recording so that only an average reading may be assumed for any period. The larger the vibration and the extraordinary movement, the less the accuracy of the average. To compensate for small vibrations, a damping means is provided in the meter of the present invention. The variable damping means includes an elongated triangular shaped magnet 44, which extends substantially along the maximum movement of the lever arm or linking mechanism between the indicating needle and the connection with the detector. As illustrated in the present meter, the magnet is placed on the vertical face of the rack support. The apex 45 is placed at the minimum point of the linking movement, and the base 46 of the triangle is placed at the maximum movement of the linking mechanism. An armature 47 of magnetic material is placed in the immobile upright 19 of the meter in a position where the magnet will pass immediately next thereto as the rack support travels from minimum to maximum movement. At minimum movement the triangular magnet has only a small portion juxtaposed with the magnetic armature providing a minimum of projected area thereon so that the damping effect is a minimum. At the upper end the base or the largest portion of the magnet is juxtaposed with the armature providing maximum projected area and maximum dampening occurs. The force between the magnet and the armature varies throughout the linkage movement due to the variable projected area of the magnet on the armature. The follower should be of a width substantially less than the length of the triangle so that it covers only a small portion of the magnet.

The use of the magnet-armature as illustrated, obviously, is usable where the main portions of the meter are made of non-magnetic material. In the case at hand, it is preferable to make the device of aluminum as it is satisfactory for agricultural use. Also, in some instances it may be desirable to have the armature as the magnet and the triangular piece as the magnetic armature, in which case a small, substantially rectangular magnet is secured in the non-movable portion of the meter, and a magnetic elongated triangular armature is secured in a movable portion of the meter. The magnet is juxtaposed with the magnetic armature so that the projected area or lines of force between the magnet and the magnetic armature vary from the apex to the base of the device. In either case, the damper will provide light damping at the low movement which is important since the vibrations will be small and full damping would distort the reading or the movement of the needle.

The vane 14 should be light and smooth so that frictional forces and inertia of the vane will be reduced to a minimum. The vane, however, cannot be too light as the buoyancy effect increases and distorts the forces acting on the vane. As applied to flowing water or similar fluids of substantially the same specific gravity, a conical vane made of aluminum is very satisfactory. A pendant mount 16 is secured to the base of the vane, and the pendant mount is secured to the hinge pivot 15. One type of hinge is illustrated in Figure 5 in which the pendant mount 16 is secured by means of a shaft 48 to the pendant support 28. The pendant mount should be rotatable about the shaft 48 so that there is free movement between the two parts.

In Figure 7 the relative movement of the vane about the hinge and the pendant support is illustrated. A stream of water or fluid flowing past the vane 14 moves the vane in a downstream direction due to the flow forces exerted on the vane. As the vane moves downstream, it pulls the pendant support 28 along with it to an angle $\alpha$, the movement of the center line 2 of the pendant support 28. Angle $\alpha$ is the magnitude of the force that is actually measured on the dial of the attached meter. The center line 3 of the vane, however, swings beyond the point of the center line 2 of the pendant support due to the various extraneous forces such as planing, buoyancy, etc. of the vane. The angle $\beta$ indicates the movement of the vane beyond the movement of the pendant support and it is not indicated on the meter. The angle $\alpha$ is substantially the movement due to the direct forces of velocity and head on the vane, while the angle $\beta$ is the movement due to irregular forces. In flow meters in which the vane has a rigid connection with the pendant support, a different angle of movement of the pendant support is obtained, and that angle is not necessarily the sum of the angles $\alpha$ and $\beta$ or ever proportional thereto. With the free moving connection between the vane and the pendant support, at a constant volume of flow, the reading of the indicating needle will be the same regardless of the proportional changes in velocity of the fluid stream height of liquid contact with the vane. With a rigid connection between the vane and the pendant support, a different result would necessarily occur with a change in velocity and a change in height on the vane where the same volume of water is flowing through the conduit. The vane of the present invention provides an extremely accurate reading throughout the ranges of flows for which it is designed and calibrated.

The vane may be used with various fluids by adjusting the weight to keep the ratio of vane weight and fluid weight broadly in the range of aluminum to water. In certain cases, the meter may be completely enclosed in a case for protection. The simplicity of the device aids in minimum maintenance requirements.

While the invention has been described by means of specific examples, there is no intent to limit the invention to the precise details so described except insofar as set forth in the following claims.

We claim:

1. A fluid flow measuring device comprising an immobile body supported adjacent a stream of flowing fluid, calibrated scale means supported on said body, indicating means suspended for movement along said scale, a detecting, pendant vane suspended so as to be partially submerged in said fluid flow reacting to forces thereon, linkage means for transmitting movement of said detecting vane to said indicating means, and a flexible connection between said detecting vane and said linkage arranged to permit free swinging of said vane in a stream flow direction whereby substantially only forces of velocity and head on said vane are relayed to said indicating means, said flexible connection permitting free swinging movement of said vane relative to said linkage.

2. A fluid flow measuring device comprising an immobile body supported adjacent a stream of flowing fluid, calibrated scale means supported on said body, indicating means juxtaposed for movement along said scale, a detecting pendant vane suspended so as to be partially submerged in said fluid flow reacting by movement to forces thereon, linkage means for transmitting said movement of said detecting vane to said indicating means, and a free swinging hinge connection between said detecting vane and said linkage arranged to permit free swinging of said vane in a stream flow direction whereby substantially only forces of velocity and head on said vane are relayed to said indicating means, said hinge permitting free swinging motion of said vane relative to said linkage.

3. A flow meter for accurately measuring the flow of a liquid stream in an open flume comprising a pendent detecting vane arranged to be suspended in a flume with its lower most end adjacent to and spaced from the bottom thereof, a pivotal mount for said vane, a free swinging connection between said vane and said mount arranged to permit free swinging of said vane in a stream flow direction and move said pivotal mount in relation to the force of flow of liquid, and means for indicating the magnitude of movement of said pivotal mount so that substantially only the height of the liquid on the vane and the velocity of the liquid in the stream affects the movement of the pivotal mount.

4. A flow meter according to claim 3 in which the connection between the vane and the mount is a free swinging pivotal hinge.

References Cited in the file of this patent

UNITED STATES PATENTS

| | | |
|---|---|---|
| 1,577,770 | Strid | Mar. 23, 1926 |
| 1,642,120 | Mathews | Sept. 13, 1927 |
| 2,038,111 | Hopkins et al. | Apr. 21, 1936 |
| 2,060,848 | Boyle | Nov. 17, 1936 |
| 2,294,869 | Buechmann | Sept. 1, 1942 |
| 2,325,326 | Kiene | July 27, 1943 |
| 2,347,830 | Kiburz et al. | May 2, 1944 |
| 2,353,617 | Lamb | July 11, 1944 |
| 2,359,592 | Stokoe | Oct. 3, 1944 |
| 2,538,369 | Leary | Jan. 16, 1951 |
| 2,539,788 | Matcovich | Jan. 30, 1951 |
| 2,541,790 | Sugden et al. | Feb. 13, 1951 |
| 2,544,122 | Abbott | Mar. 6, 1951 |
| 2,700,899 | Myers | Feb. 1, 1955 |
| 2,765,656 | Parshall | Oct. 9, 1956 |

FOREIGN PATENTS

| | | |
|---|---|---|
| 602,146 | France | Dec. 18, 1925 |
| 342,006 | Great Britain | Jan. 29, 1931 |